July 16, 1968     J. W. THOMSEN     3,392,929
SELF-WINDING FILM REEL ASSEMBLY
Filed Feb. 7, 1966     2 Sheets-Sheet 1
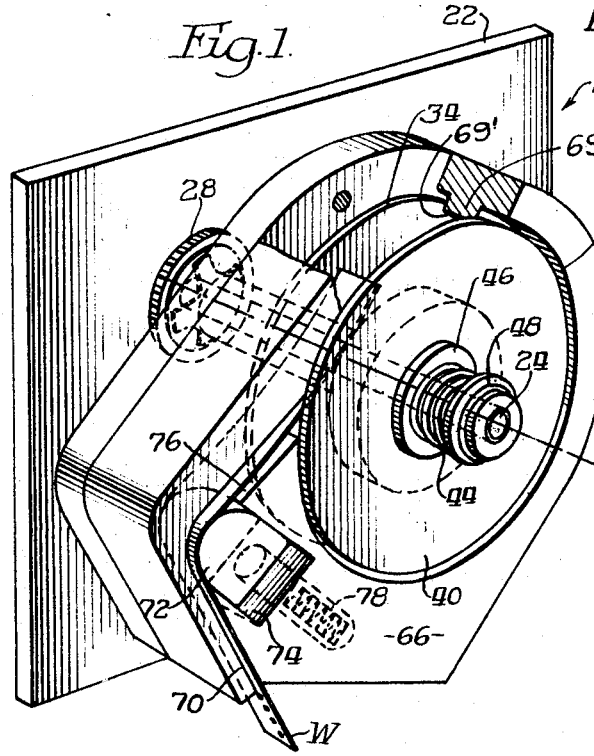
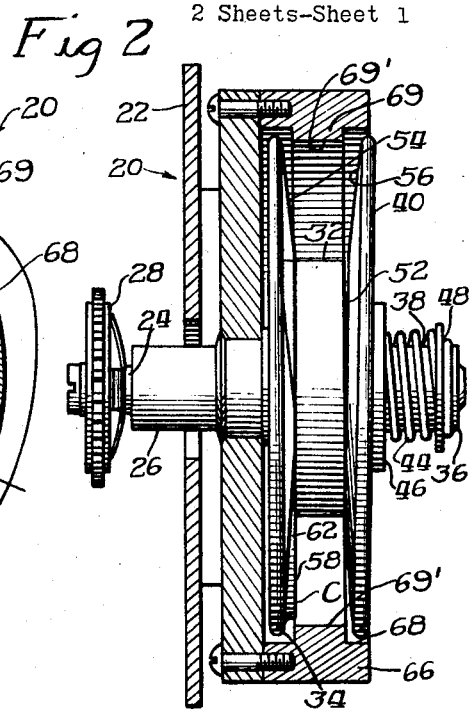
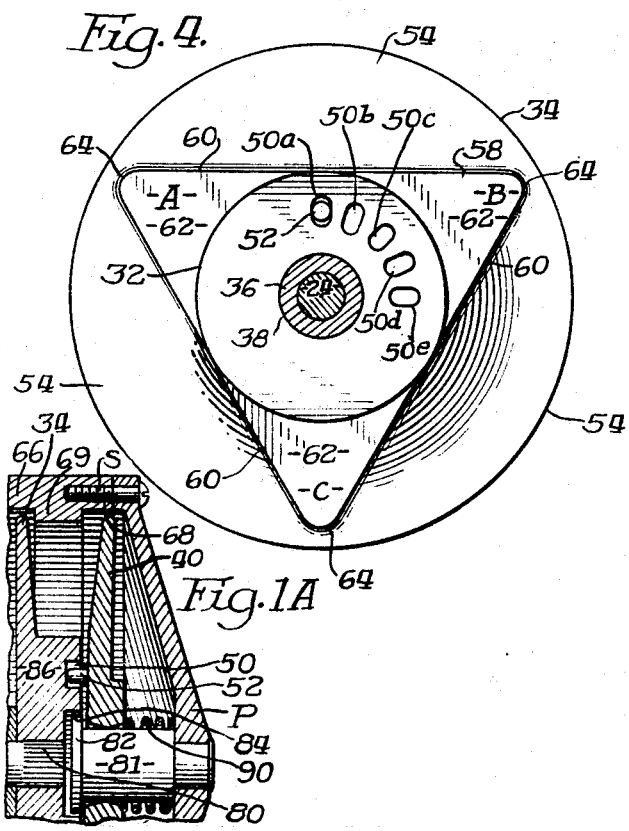
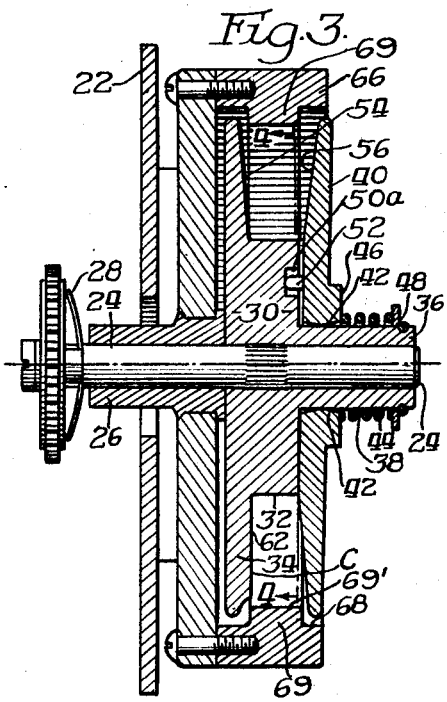
Inventor:
Jack W. Thomsen.

July 16, 1968  J. W. THOMSEN  3,392,929

SELF-WINDING FILM REEL ASSEMBLY

Filed Feb. 7, 1966  2 Sheets-Sheet 2

(INITIAL POSITION)

(1 REV.)

(1.5 REV.)

(2.0 REV.)

(2.5 REV.)

Inventor:
Jack W. Thomsen.

United States Patent Office 3,392,929
Patented July 16, 1968

3,392,929
SELF-WINDING FILM REEL ASSEMBLY
Jack W. Thomsen, La Grange Park, Ill., assignor to
Bell & Howell Company, Chicago, Ill., a corporation of Illinois
Filed Feb. 7, 1966, Ser. No. 525,468
17 Claims. (Cl. 242—67.1)

ABSTRACT OF THE DISCLOSURE

Disclosed is an assembly including a drivable reel having a hub, and first and second axially spaced flanges. One flange is fixed to the hub, and the other is axially slidably urged toward the fixed flange. A lug extends from a portion of the inner face of one flange into engagement with the movable flange to cause the latter to be slightly tilted with respect to the hub's axis. Thus, an innermost portion of the inner face of one flange is closer to the other flange than the remainder of the other flange's inner face. An arrangement to variably space the flanges is also disclosed.

---

The present invention relates to improvements in the field of film reeling and, more particularly, to a new and improved self threading movie film reel mechanism wherein the end of the film is fed into a position between the reel's flanges which automatically grasp the film and wind it about the hub of the reel.

While this invention is primarily for the purpose of winding movie film in a projector, other possible uses would be the winding of other tape-like members such as recording tape, video tape or other ribbon-like web members.

In some advanced movie film devices, it is desirable to feed film at high speed to self-threading take-up reels in relatively inaccessible positions. Correction of malfunctions of the take-up reel during threading requires a time-consuming disassembly of the device due to the inconvenient location of the reel. Accordingly, it is highly desirable to provide a completely reliable self-threading take-up reel for feeding film at high speed.

It is also desirable to enclose film reels to protect the film from dust and foreign matter. However, this has not been practical in the past since such an enclosure would have to be removed for threading of the film into the reel. Also, the prior art threading reels have not been sufficiently reliable to facilitate the employment of such an enclosure because malfunctions of the reel during threading necessitate a removal of the enclosure. However, it is necessary that any enclosure for a feeding reel be removable because film occasionally breaks, through no fault of the reel, as during a projection run. Such breakage necessitates that the reel be accessible so that the film on the reel can be removed. Accordingly, it is highly desirable to provide a completely enclosed and completely reliable self-threading take-up reel which is nevertheless relatively easily accessible.

Thus, the general object of this invention is the provision of an improved self-threading web reel capable of functioning with complete reliability.

One conventional reel widely employed in movie projectors is disclosed in U.S. Patent No. 3,053,465. This reel has a circular series of teeth aligned about the periphery of the hub for engaging feeding perforations in the film leader. Reels of this type function quite reliably but do not engage the perforations 100% of the time. Furthermore, after repeated use, the teeth have a tendency to tear the end perforation, thereby necessitating a trimming of the end.

Another problem found in the prior art is that of retrieving the film end from the take-up reel when the film accidentally breaks as occasionally occurs. This can be particularly tedious with reels having flanges fixed to the hub and it is practically impossible when the take-up reel is enclosed in a chamber or recess mounting. It is sometimes necessary to completely remove the reel from the projector in order to correct such accidents.

Another conventional self-threading web reel is disclosed in U.S. Patent No. 2,015,860 and uses plural leaf springs located a considerable distance from the axis of rotation for urging one of two flanges toward the other flange so as to engage the edges of a web inserted therebetween. Such reels have functioned adequately for their intended purpose when a movie film is inserted between the flanges at relatively low speeds; however, such reels do not provide the complete reliability required in modern high speed equipment and must be located so as to be readily accessible in case of malfunction of the reel. Moreover, because the urging force is applied at a considerable distance from the hub, a relatively large urging force is applied to the film edges. Film fed between the flanges must overcome the large urging force of this type of reel and as a result, the film end is ofttimes merely deflected by the flanges rather than grasped for reeling. This is particularly true when the film has a slight twist so that it is not exactly perpendicular to the plane of the flanges. Consequently, the reel disclosed in said patent is not entirely satisfactory for movie film and not at all satisfactory for thinner webs such as magnetic tape, for example. The reason for this is that the thinner webs tend to be twisted or deflected rather than grasped by the flanges. As noted, with movie film these reels have not been wholly reliable and therefore are not suitable for use where the reel is inaccessibly located.

Improvements have been made in the device of the aforementioned U. S. Patent No. 2,015,860. In some of these improved reels the means for urging one of the flanges has been made more flexible and located at a position so that thinner films may be used. Another improvement over the device of the aforementioned U. S. patent employs a reel wherein one of the flanges is tilted slightly with respect to both the other flange and the reel axis so as to present a cyclically widening and then narrowing distance between the flanges as they rotate past a given point. In this manner the narrowing portion serves to grasp the edge of a film fed between the flanges. Both of the aforementioned improvements employ smooth faced inner surfaces on the flanges and have been capable of operating with greater efficiency, flexibility and reliability than the prior art devices. Even these improved reels have a certain amount of slip between the flanges and the web before the flanges grasp the film. As a consequence the flanges eventually wear down the edges of the film to such an extent that the film can no longer be effectively fed to reels of this type.

Other reels having a slot or clip on the hub thereof for manually attaching the free end of the film thereto have long been used in a variety of devices. Many of these reels require a time consuming manual removal of the end of the film when the film is rewound onto another reel. Another inherent deficiency arising from these manual operations is that the reel must be easily accessible and cannot be used in interior portions of the parent machine. U.S. Patent No. 3,208,688 is exemplary of devices of the type employing mecahnical retaining means which require manual manipulations in order to fasten the end of the film to the reel.

It has also been a practice to manually roll several convolutions of a film about a reel hub so as to provide sufficient frictional engagement of the film with the reel to permit the reel to wind the remainder of the film upon the reel which is subsequently driven by power means. These devices also require time consuming manual manipulations and therefore must be located in readily accessible portions of the parent machine. The requirement for accessible location of the conventional reels often results in complicated and elongated feedpaths and a bulky mechanism which adds to the overall cost of the apparatus and often impairs the apparatus' primary functional purpose.

In summation, advances in many devices which incorporate film feed means have created the need for a completely reliable self-threading reel capable of gripping and feeding a film fed thereto at any speed and especially at high speed. The need to minimize or eliminate all unnecessary time-consuming operations has become of paramount importance. These conditions indicate the desirability of reliable film take-up reels which function rapidly without manual manipulations or constant observation.

It is therefore, an object of this invention to provide an improved take-up reel that will automatically wind flexible films thereon.

A further object of this invention is to provide a take-up reel that will function with complete reliability and dependability.

Another object of this invention is to provide a take-up reel that can be fully enclosed but the interior of which is readily accessible in case of film breakage.

Yet another object of this invention is the provision of a reliable take-up reel which will automatically thread film with a complete absence of mutilation of the film.

Another object of this invention is to provide a take-up reel that will function without manual manipulations by the operator.

A still further object of this invention is the provision of a take-up reel that will function with such complete reliability so as to be feasibly located in inaccessible positions.

Yet anoother object of this invention is the provision of a take-up reel that presents a varying distance between the flanges thereof for each rotation of the reel with the minimum distance during each rotation being readily adjustable over a small range of values.

The reel of the invention comprises a driven reel assembly having a hub and first and second axially spaced flanges. The first flange is fixed to the hub. The second flange is axially slidably urged toward the first flange. An extension extends axially from a portion of the inner face of one of the flanges and terminates in a planar surface so that one of the flanges is slightly tilted with respect to the hub axis. Accordingly, an innermost portion of the inner face of one flange is closer to the other flange than the remainder of the one flange's inner face. As the reel rotates, a web end fed between the flanges and into the path traversed by the extension of one flange is grasped by the said extension and the innermost portion of the other flange and continued rotation of the reel rapidly draws the web into a tight convolution about the hub.

Another aspect of the invention includes a readily adjustable means for selectively positioning the one flange about its axis so as to vary its angular position with respect to the other flange. In this manner, the minimum distance between the two flanges may be selectively varied in order to correct for tolerances in manufacture or for any other reason such as variations present in different types of film bases.

Another aspect of this invention involves the concentric mounting of the take-up reel within a cylindrical opening having an extension between the flanges which prevents accidental deflection of the leader end of the tape from between the flanges.

Still another aspect of the invention is the provision of a removable cover plate over one end of the cylindrical opening with one of the reel flanges being mounted for rotation on a shaft attached to the cover plate. In this manner removal of the cover plate and the attached flange as a unit enables easy access to the interior of the reel.

Other objects and many of the attendant advantages of this invention will be readily appreciated as the same become better understood by reference to the following detailed description when considered in connection with the accompanying drawings in which like reference numerals designate like parts throughout the figures thereon and wherein:

FIG. 1 is a perspective view of a first embodiment of a reel assembly and mounting means of this invention;

FIG. 1A is a sectional view of reel assembly and mounting means of a second embodiment of this invention;

FIG. 2 is a side view of the FIG. 1 reel assembly with portions of the mounting structure removed;

FIG. 3 is a bisecting vertical sectional view of the reel assembly of FIG. 2;

FIG. 4 is a section of a portion of the reel assembly taken along lines 4—4 of FIG. 3;

Figure 5:
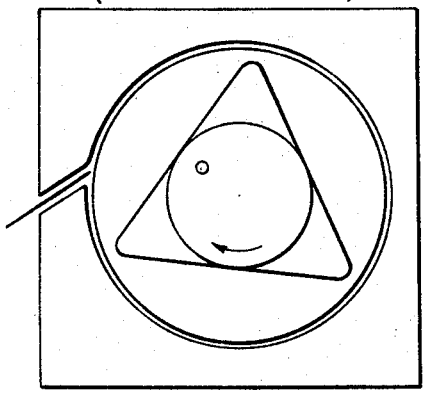
FIGS. 5 through 9 are views of the reel assembly illustrating sequential steps of the winding of a film end onto the reel assembly of both embodiments of this invention.
Figure 6:
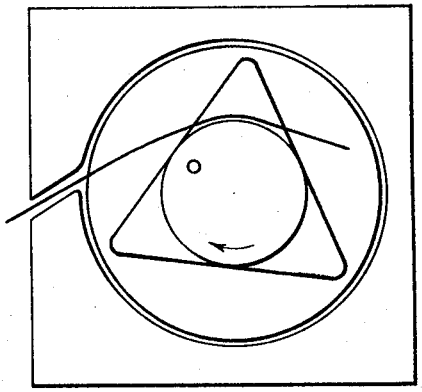
Figure 7:
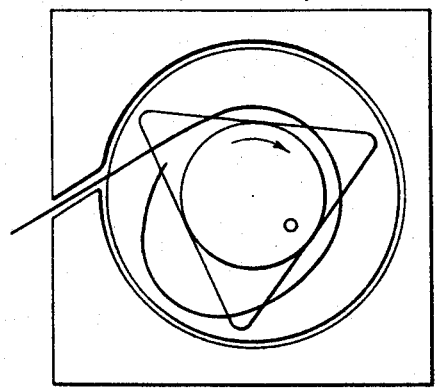
Figure 8:
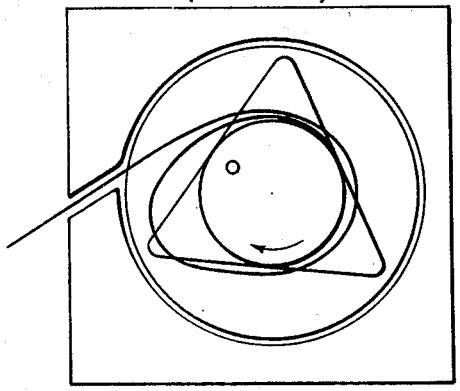

Referring now to the drawings, one embodiment of this invention is for a film reel means for reeling a film and is generally designated 20 as shown in FIG. 1 and FIG. 2 wherein a member 22 constitutes a frame or structural element of the parent machine such as a projector in which the reel is employed. A shaft 24 is mounted in suitable bearings 26 attached to the frame member in any conventional manner. Shaft 24 is driven through a slip clutch means 28 which is driven from the drive motor of the parent device. A hub member 30 (FIG. 3) is fixed to shaft 24 for concentric rotation therewith. The hub member has a concentric outer film receiving surface 32 of an axial length slightly less than the width of the web being fed. A first flange member 34 is formed integrally with the hub at one axial end thereof. Both axial ends of hub 30 are located in planes perpendicular to the axis of rotation as illustrated in FIG. 3.

A flange-supporting member 36 extends axially from the end of hub 30 opposite to the end having flange 34 thereon and has an outer flange supporting surface 38 concentric to the axis of shaft 24. A second flange 40 is slidably mounted on said flange supporting surface 38 for axial movement toward and away from the hub. A hole in the flange 40 encircles the flange supporting surface 38 and has a curved wall 42 to enable easy axial and pivotal movement of the flange. A coil spring 44 is mounted adjacent to the flange-support member so that one end of spring 44 lightly engages the outer end 46 of flange 40 at an inwardly spaced radial surface near flange supporting surface 38. The other end of the spring 44 engages a clip member and washer means 48 fixed to the end of the flange support so that flange 40 is constantly urged toward hub 30 by means of a force applied to an area near its axis.

The end of hub 30 adjacent to the second flange 40 has a plurality of cavities 50a, 50b, 50c, 50d, and 50e equidistantly spaced about a segment of the periphery thereof (FIG. 4). A lug member 52 extends from flange 40 so as to enter one of the cavities and provide a rotational drive from the hub to the flange. The lug 52 is slightly longer than the depth of the cavities. Consequently, flange 40 is tilted slightly with respect to the axis of shaft 24.

Flange members 34 and 40 have inwardly facing smooth tapered surfaces 54 and 56 respectively. Smooth surfaces 54 and 56 are slightly tapered from points adjacent film receiving surface 32 to their outer peripheries as shown in FIGS. 2 and 3. A substantially triangular web-edge engaging extension 58 (FIGS. 2 and 4) extends in an axial direction from the tapered surface 54 of flange 34. The triangular extension terminates in a planar surface 62 that is substantially perpendicular to the axis of shaft 24, as shown. The sides 60 of the triangular extension are of equal length and each side is tangential to the film supporting surface 32 of the hub 30 so as to form three lobes A, B, and C as illustrated in FIG. 4. The corners 64 of the triangular extension are rounded and each constitutes a radial termination at a point slightly inward from the periphery of the flange as shown in FIG. 4. It will be appreciated that the extension 58 can be of shapes other than triangular which will perform the same function. Furthermore, the extension does not need to extend to the periphery of the flange as long as it is in the path of film supplied to it.

The hub and associated flange members are mounted within an enclosing member 66, a portion of which is cut away for clarity in FIG. 1. Hub enclosing member 66 has a recessed cylindrical cavity 68 therein which is concentric about the axis of shaft 24 and which has a slightly greater diameter than the diameters of flanges 34 and 40. The surfaces 54 and 56 of flanges 34 and 40 are completely within the confines of recessed cavity 68 as illustrated in FIG. 2.

A rib 69 extends inwardly from the wall of cavity 68 between flanges 34 and 40 to terminate in a cylindrical surface 69' which keeps the film confined within the periphery of the flanges. A narrow film feed slot 70 extends through members 66 and 69 to communicate with cavity 68. Film feed slot 70 is oriented so that a film end fed from same extends chordally with respect to the flanges, between the flanges, and between the film receiving surface 32 and the outer peripheries of the flanges. A spring urged snubber 72 is mounted in a slot 74 communicating with film feed slot 70 and extends into slot 70 to engage the film W therein. Snubber 72 is limited in its movement into film feed slot 70 by abutment 76 which prevents movement of snubber 72 completely across film feed slot 70 by spring 78. Snubber 72 prevents the torque of the take-up reel from pulling the film out of the associated projector's film gate (not shown) when the shuttle tooth (also not shown) is out of engagement with the film. The film gate and the shuttle tooth can be conventional and have not been illustrated since they form no part of this invention.

The manner in which the reel is substantially completely enclosed by opening 68 and the location of a surface 69' between the flanges is very advantageous since there is no way in which the film can be deflected from between the flanges. The curved surface 69' also serves in some instances to guide the film into a partial convolution until there is sufficient frictional engagement between the flanges and the film to grasp the film and wind it in the manner to be discussed more explicitly hereinafter.

The axial distance between planar surface 62 of extension 58 and the inwardly facing tapered surface 56 of flange 40 is always less than the width of the film while the reel is empty. The axial distance between the tapered inwardly facing surfaces 54 and 56 is always slightly greater than the width of the film. Flange 40 is tilted with respect to the axis of shaft 24 due to the fact that lug 52 is slightly greater in length than the depth of cavities 50. Consequently, flange 40 rotates with a wobbling motion when the reel is empty and presents a varying axial distance between surface 56 and surface 54 or 62 as the reel rotates past any given stationary point. Flange 40 can be manually pulled outwardly against the force of spring 44 and rotated so as to position lug 52 in any selected one of the cavities 50. In the position illustrated in FIGS. 3 and 4 lug 52 is in the uppermost cavity 50(a) and the lower portion of surface 56 is tilted inwardly toward surface 62 so that surface 62 of lobe C has an average axial distance from surface 56 less than does either of lobes A and B. That portion of surface 56 that is spaced 180° about the axis of the flange from lug 52 is obviously spaced farther inward than any other portion of surface 56 for any given radial distance from the axis of the flange. With lug 52 in the position illustrated in FIG. 4 the maximum inward position of surface 56 lies along a line diagonally opposite lug 52 with said line bisecting lobe C. This position illustrates the minimum axial distance possible between surfaces 62 and 56. If the lug 52 is shifted clockwise to the next adjacent cavity 50(b) the maximum inward position of surface 56 is shifted clockwise to a position substantially completely opposite surface 54 and the average axial distance between surface 56 and lobe C is slightly greater than it was in the previous position. However, the average axial distance would still be less than the average axial distance between surface 62 of either of lobes A or B and surface 56. The preciseness of adjustment possible is obviously varied by the number of cavities employed.

The aforementioned structure provides a reel having adjustability of the minimum axial distance between the flanges thereof. This adjustability is very slight and is in the order of thousandths of an inch since flange 40 is only slightly tilted about its axis. However, this small adjustment is of value in correcting for manufacturing tolerances and in obtaining an optimum reeling effectiveness for any particular film type since different film types vary slightly in thickness, width, rigidity, and other physical characteristics. For example, it has been found that films having a Mylar® base will behave differently than acetate base films. Once the optimum adjustment is determined for any specific film type, no further adjustment is usually necessary.

A second embodiment of this invention, illustrated in FIG. 1A, provides means whereby the take-up reel is fully enclosed on all sides yet is easily accessible in case of film breakage. In this embodiment the enclosing member 66 is identical with hhe same member described above with respect to the first embodiment with the exception that plural taps are provided on one end thereof to receive screws S for attachment of a cover plate P thereto. It should be understood that FIG. 1A fully illustrates only the upper half of plate P and the reel; however the lower portion of plate P which is not illustrated is identical with the illustrated portion. Consequently, FIG. 1A illustrates only one screw S, however, it should be understood that two or more screws are actually employed. When two screws are employed, the other screw is diametrically opposite the screw illustrated in FIG. 1A.

The first and second flanges 34 and 40 of this embodiment are identical with the same flanges of the first embodiment. However, the first and second flanges are concentrically mounted on first and second shafts 80 and 81 respectively. The second shaft 81 is fixed to plate P and flange 40 is mounted for rotation on and about shaft 81. The end of shaft 81 furthermost spaced from plate P terminates in a cylindrical lug 82 which extends into a cylindrical opening 84 in hub member 86. Hub member 86 is fixed to shaft 80 which is driven in the same manner as was shaft 24 in the prior embodiment. A series of cavities 50(a) etc. which are identical with cavities 50a, 50b, etc. of the first embodiment, are located in hub member 86 for receipt of lug member 52. The driving and tilting coaction between cavities 50 and lug 52 is identical with that of the first embodiment.

The flange 40 slidingly rotates on shaft 81 and is urged toward hub member 86 by means of a spring 90 which is essentially identical with spring 44 of the first embodiment. The spring 90 is compressed between plate P and flange 40. Flange 40 and spring 90 are in sliding contact when the flange is rotating. It is also possible that spring 90 would be in rotating sliding contact with plate P. However, the sliding contact of spring 90 within either of said elements creates no problem due to the fact that the urging force of spring 90 is very low.

Should it become necessary to obtain access to the interior of the reel, such as in instances when the film should break during a projection run, screws S are removed and plate P, shaft 81 and flange 40 are removed as a unit. The cylindrical lug 82 prevents the spring 90 from pushing the flange 40 off of shaft 81 upon such removal.

It is accordingly obvious that the second embodiment provides a completely enclosed chamber for mounting the take-up reel so as to protect the reel and film from dust and foreign particles while still retaining the advantage of easy accessibility to the interior of the reel.

Figure 9:
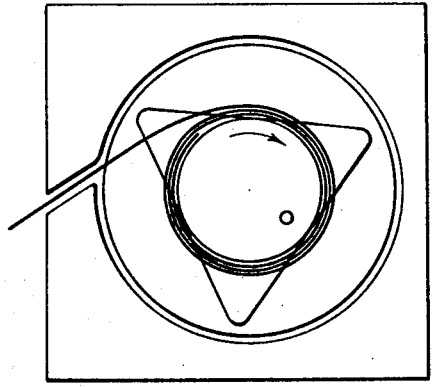

The operation of both of the above-described embodiments when receiving a film to be wound is identical and will be discussed with reference to FIGS. 5 through 9. FIG. 5 illustrates the beginning of a film feed operation with the film just beginning to exit from slot 70 and enter the area between the reel flanges. FIGS. 6 through 9, which are self-explanatory, illustrate successive steps in the engagement of the film end and subsequent winding of the web by the reel. Each of FIGS. 6–9 contains a caption indicating the number of revolutions made by the reel from the position illustrated in FIG. 5. It should be noted that FIG. 9 illustrates that the film end is completely wound around the hub after only 2.5 revolutions of the reel. Obviously this can vary somewhat with different initial relative positions of the reel and the film end. The quickness with which the film end becomes wound about the hub keeps the time during which the flanges frictionally engage and slip on the film edges to a minimum. Hence, the structure of the invention results in less wear on the film than has heretofore been possible.

Shaft 24 is driven at a constant angular velocity by friction drive means 28 and as a consequence thereof the hub and flange 34 and 40 are driven at the same angular velocity. The film is fed at a velocity that is less than the surface velocity of any given point of the reel flanges 40 and 34. The film enters betwween flanges 34 and 40 and if it should happen to enter between the flanges at their closest position the higher speed of the flanges quickly moves the narrow portion ahead of the film so that the film end is in the wider area. Since the flanges are moving at a greater speed than the film, continued rotation of the flanges soon brings them to a position wherein the smaller axial distance between the planar surface 62 of extension 58 and the inwardly facing surface of flange 40 engage the edge of the film which becomes wedged therebetween and is subsequently in a tightening convolution about the hub member for continued reeling thereon.

The initial engagement of the film between the flange members 34 and 40 is such that the flange member 40 is tilted slightly against spring 44. When the film has moved to the inner position about the coil supporting surface, there is no further "slack" to be taken up and slippage between clutch 28 and the reel permits the reel to be slowed down by the film. In this manner there is no longer any speed differential between the film and the reel and the reel merely "keeps up" with the infeed speed of the film. In order to minimize the force required for the pivoting action of flange 40, the single spring elements 44 and 90 are located close to the axis of the shaft of the structure and the spring constant of said springs is of a low value. The curved side wall 42 of the hole in flange 40 also serves to minimize the resistance to the pivoting of the flange.

This invention provides an adjustable, rapid winding and fool-proof reel that is completely reliable in operation and has the further advantage of causing only a minimum amount of wear on the film fed thereto. Consequently, it will be appreciated that the structure of the invention is not only admirably suited for general use as a take-up reel, but is particularly suited for use in devices where the take-up reel is inaccessibly located.

Obviously, many modifications and variations of the present invention are possible in light of the above teaching. For example, although the preferred embodiments of this invention have been described in terms of a film receiving means, it should be understood that other possible uses of this invention would be in devices such as tape recorders, video recorders and many other devices requiring the feeding of a web onto a reel. It is therefore to be understood that within the scope of the appended claims the invention may be practiced otherwise than as specifically described herein.

The embodiments of the invention in which an exclusive property or privilege is claimed are defined as follows:

1. A film reel comprising:
   a hub member mounted for rotation about an axis;
   axially spaced first and second flanges mounted for rotation about said axis;
   means permitting said second flange to be supported at a slight angle with respect to said axis;
   means for urging said second flange toward said first flange; and
   an extension extending axially from said first flange and having a surface facing said second flange with said extension having a radial termination extending toward the periphery of said first flange;
   whereby a film feed between said extension and said second flange is engaged and grasped for winding by said extension and said second flange when said flanges are rotated.

2. The device of claim 1 wherein said extension terminates adjacent the periphery of said first flange.

3. The device of claim 1 wherein said surface on said extension lies in a plane substantially perpendicular to said axis.

4. The device of claim 1 further including:
   a cavity on one end of said hub; and
   lug means extending from said second flange into said cavity to provide a rotational drive from said hub to said second flange.

5. The device of claim 1 further including:
   a plurality of cavities equally spaced radially about a portion of the periphery of one end of said hub; and
   lug means extending from said second flange for selective positioning in a selected one of said cavities so as to enable a variation of the minimum average axial distance between said surface on said extension and said second flange.

6. The device of claim 1 wherein said reel is mounted for rotation in a cylindrical cavity in an enclosing member which cylindrical cavity is concentric with and encloses the outer periphery of said flanges; and
   a cylindrical rib extending inwardly between said flanges from the wall of said cylindrical cavity and terminating in a curved surface spaced within the peripheries of said flanges to prevent the film end from being deflected from between said flanges.

7. The device of claim 6 wherein said first and second flanges are respectively mounted on first and second axially aligned shafts; and
   further including cover plate means detachably mounted on said enclosing member to completely enclose the reel and having said second shaft attached thereto so that said cover plate means, said second shaft and said second flange can be removed as a unit from the other structure.

8. The device of claim 7 wherein said surface on said extension is triangular.

9. The device of claim 8 further including:
   friction drive means for rotating said hub and flanges.

10. A film take-up reel for receiving an elongated film, one end of which is fed to said reel at a point between the flanges thereof at a given velocity so as to wind said web upon said reel comprising:
    a frictionally driven hub member having an axis of rotation and a peripheral film supporting surface;
    a first flange extending from a first end of said hub member for rotation therewith;
    a tapered surface on said first flange;
    a second flange mounted for axial movement relative to said hub and for rotational movement with said hub, said second flange having a tapered surface which faces said tapered surface of said first flange;
    a substantially triangularly shaped extension extending axially from the tapered surface of said first flange toward said second flange and terminating in a planar surface lying in a plane substantially perpendicular to said axis and facing said tapered surface of said second flange wherein the velocity of said planar surface and said inwardly facing surfaces is greater than the velocity of said web end; and means urging said second flange toward said first flange into engagement with a second end of said hub to a position wherein the axial distance between said planar surface and said tapered surface of the second flange is slightly less than the width of the film so that the end of the film fed between said flanges is grasped by said planar surface of said triangular extension and the tapered surface of the second flange so as to be moved radially inwardly to form a complete convolution about the peripheral film supporting surface of said hub.

11. The device of claim 10 wherein said reel is mounted for rotation in a cylindrical opening in an enclosing member which opening is concentric with and encloses the outer periphery of said flanges; and a cylindrical rib extending inwardly between said flanges from the wall of said cylindrical opening and terminating in a curved surface spaced within the peripheries of said flanges to prevent the film end from being deflected from between said flanges.

12. The device of claim 10 further including a flange supporting member extending axially from the second end of said hub for supporting said second flange for axial movement thereon.

13. The device of claim 10 further including:
a shaft for supporting said hub, and
friction drive means for rotatably driving said shaft.

14. The device of claim 13 wherein said second end of said hub has plural cavities therein and further including, lug means extending from said second flange into a selected one of said cavities so as to provide a rotational drive from said hub to said second flange and an adjustment of the minimum axial distance between said planar surface and said tapered surface of said second flange.

15. The device of claim 10 wherein said substantially triangular extension has sides of equal length which are tangential to the film supporting surface of the hub and said extension has rounded corners spaced a small distance inwardly from the outer periphery of the flanges.

16. The device of claim 15 further including a flange supporting member extending axially from a second end of said hub for supporting said second flange for axial movement thereon.

17. The device of claim 16 further including:
a shaft for supporting said hub, and
friction drive means for rotatably driving said shaft.

References Cited

UNITED STATES PATENTS

| | | | |
|---|---|---|---|
| 2,916,225 | 12/1959 | Swallow et al. | 242—68 |
| 3,208,688 | 9/1965 | Hanes | 242—74.2 |
| 3,286,945 | 11/1966 | Steisslinger | 242—71.2 |
| 3,295,778 | 1/1967 | Fiorentino et al. | 242—74 X |
| 3,313,498 | 4/1967 | Wasson | 242—96 |
| 3,323,746 | 6/1967 | Mouissie | 242—74.2 |

WILLIAM S. BURDEN, *Primary Examiner.*